United States Patent
Varoglu et al.

(10) Patent No.: US 8,855,614 B2
(45) Date of Patent: Oct. 7, 2014

(54) RETRIEVING CONTACT INFORMATION FROM MULTIPLE DEVICES

(75) Inventors: Devrim Varoglu, Santa Clara, CA (US); Swapnil Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/536,196

(22) Filed: Jun. 28, 2012

(65) Prior Publication Data

US 2014/0004837 A1 Jan. 2, 2014

(51) Int. Cl.
*H04L 29/06* (2006.01)
*H04M 1/38* (2006.01)

(52) U.S. Cl.
USPC ............... 455/414.3; 455/569.1; 455/569.2; 709/248

(58) Field of Classification Search
CPC ............ H04M 3/42008; H04M 3/42042; H04W 56/00; H04W 76/02; H04W 76/04
USPC ...................................... 455/414.3
See application file for complete search history.

(56) References Cited

U.S. PATENT DOCUMENTS

| | | | |
|---|---|---|---|
| 2007/0189501 A1* | 8/2007 | Lai et al. .................. | 379/355.01 |
| 2007/0260751 A1* | 11/2007 | Meesseman ................. | 709/248 |
| 2008/0085745 A1* | 4/2008 | Ozaki ........................ | 455/569.2 |
| 2009/0011799 A1* | 1/2009 | Douthitt et al. ........... | 455/569.1 |
| 2010/0042733 A1* | 2/2010 | Jeffrey ....................... | 709/228 |
| 2010/0157990 A1* | 6/2010 | Krzyzanowski et al. ..... | 370/352 |
| 2010/0197362 A1* | 8/2010 | Saitoh et al. ............... | 455/569.2 |
| 2010/0210316 A1* | 8/2010 | Okayasu .................... | 455/569.2 |
| 2010/0275032 A1* | 10/2010 | Bhangi ....................... | 713/182 |
| 2013/0244622 A1* | 9/2013 | Hillier et al. ............... | 455/414.1 |

FOREIGN PATENT DOCUMENTS

JP 2006311143 * 4/2005

* cited by examiner

*Primary Examiner* — Timothy Pham
(74) *Attorney, Agent, or Firm* — Wong, Cabello, Lutsch, Rutherford & Brucculeri LLP

(57) ABSTRACT

A first device may be connected to a synchronization device to allow utilization of the first device through an interface of the synchronization device. The connection may be utilized to obtain contact information from the first device by the synchronization device. If it is determined that the contact information retrieved from the first device does not include desired contact information, the desired contact information may be retrieved from a second device. The contact information obtained from the second device may be utilized to initiate communication via the first device through an interface of the synchronization device.

20 Claims, 5 Drawing Sheets

RETRIEVING CONTACT INFORMATION FROM MULTIPLE DEVICES

BACKGROUND

This disclosure relates generally to the retrieval of contact information by a synchronization device from a device other than a primary connected device. More particularly, but not by way of limitation, it relates to the usage of contact information retrieved from a device other than the primary device to initiate communication that is to be conducted using the synchronization device.

As is known by those skilled in the art, existing synchronization devices may be linked with a user's device to provide the functionality of the device through an interface of the synchronization device. By way of example, a car kit synchronization device may be linked to a mobile phone to enable telephone calls to be conducted using the synchronization device with call audio presented over a vehicle's audio system. The linkage between synchronization and user devices may, for example, be based on known wireless communications technologies.

Existing synchronization devices may retrieve contact information (e.g., a contact list, recent call history information, etc.) from a user device such that the contact information can be utilized from the synchronization device in essentially the same manner as it is used on the user's device. For example, retrieved contact information may be utilized to initiate a telephone call to a phone number associated with a recently missed call or to place a telephone call to an individual listed in a retrieved contact list through an interface of the synchronization device. However, if desired contact information cannot be retrieved from the synchronization device, it may be inconvenient to manually initiate communication through the synchronization device. Therefore, it would be desirable to obtain the necessary contact information such that it could be utilized to initiate a desired communication through an interface of the synchronization device.

SUMMARY

In one embodiment, the invention includes a method to establish a first connection, by a synchronization device, to a primary device over which contact information may be obtained from the primary device. The synchronization device may also establish a second connection with a secondary device over which contact information may be obtained. The contact information obtained from the primary and secondary devices may be displayed by the synchronization device. The primary device may be requested by the synchronization device to initiate communication (to be conducted using the synchronization device) with a recipient device based on contact information obtained from the secondary device. The method may be embodied in program code and stored on a non-transitory storage medium. The stored program code may be executed by a processor that is part of, or controls, the synchronization device.

In another embodiment, the invention includes a method to establish a connection, by a synchronization device, to a primary device over which contact information may be obtained from the primary device. In response to the receipt of a request to obtain contact information for a recipient device, the synchronization device may send a request to the primary device to retrieve contact information for the recipient device from a remote secondary device. The requested contact information may be received by the synchronization device from the primary device and the synchronization device may thereafter request the primary device to initiate communication (to be conducted using the synchronization device) with the recipient device. The method may be embodied in program code and stored on a non-transitory storage medium. The stored program code may be executed by a processor that is part of, or controls, the synchronization device.

In yet another embodiment, the invention includes a method to establish a connection, by a first device, with a synchronization device and provide contact information from a data store to the synchronization device. The first device may then receive a request from the synchronization device to obtain contact information for a recipient device from a remote secondary device, relay the request to the remote secondary device, receive a response that includes contact information for the recipient device from the remote secondary device, and pass the contact information to the synchronization device. In response to the receipt of a request from the synchronization device, the first device may initiate communication (to be conducted using the synchronization device) with the recipient device. The method may be embodied in program code and stored on a non-transitory storage medium. The stored program code may be executed by a processor that is part of, or controls, the first device.

DETAILED DESCRIPTION

This disclosure pertains to systems, methods, and computer readable media for the retrieval of contact information stored on multiple devices by a synchronization device. In general, techniques are disclosed for establishing a linkage between a synchronization device and a device other than the primary device for purposes of obtaining contact information stored on the non-primary device. The obtained contact information may then be utilized by the synchronization device to initiate communication via the primary device. By way of example, a synchronization device may include a car kit that interfaces with a mobile phone.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of mobile device communications having the benefit of this disclosure.

Figure 1:
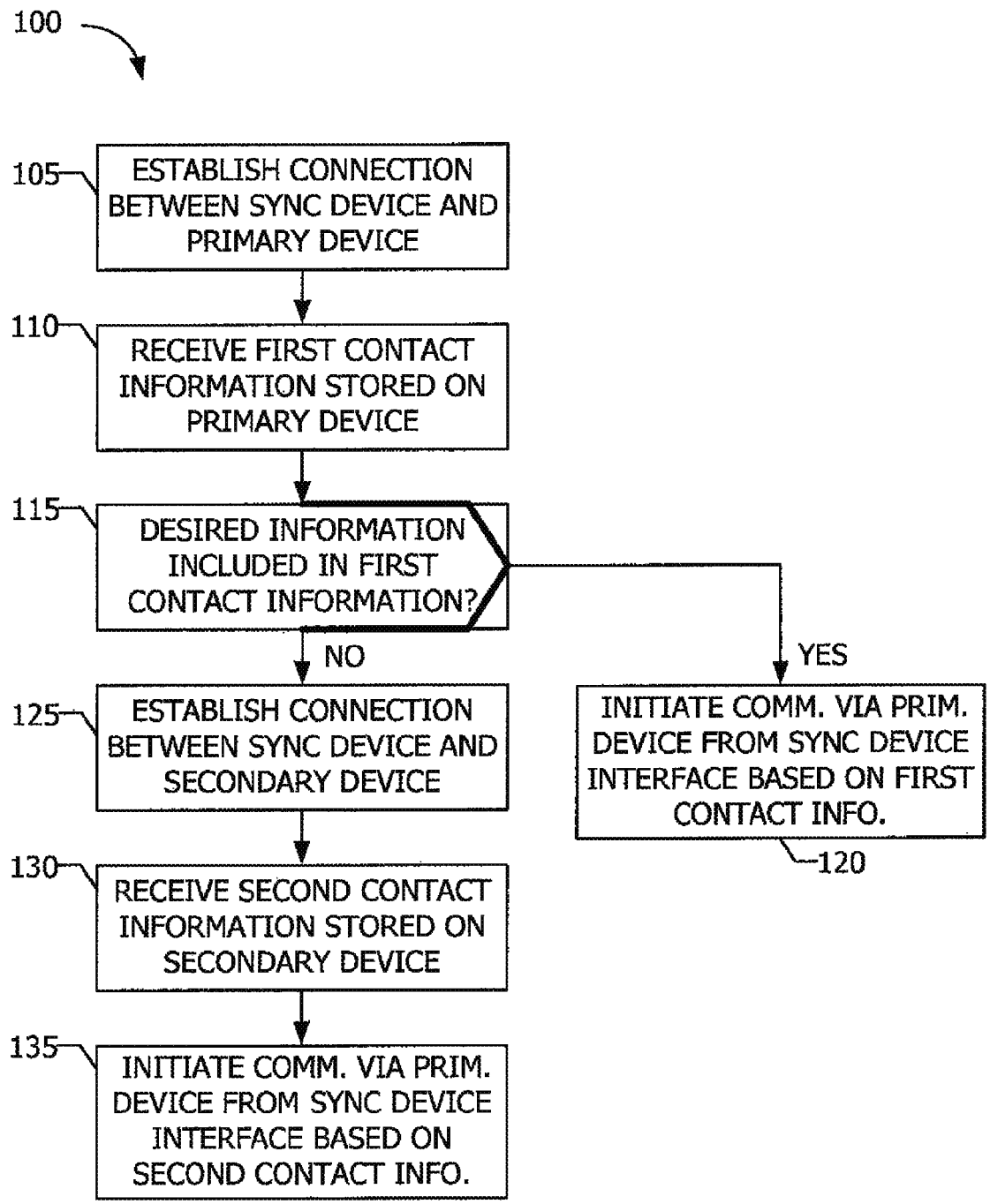
FIG. 1 is a flowchart that illustrates the retrieval of contact information from primary and secondary connected devices in accordance with one embodiment.

Referring to FIG. 1, contact retrieval process 100 in accordance with one embodiment may be initiated with the establishment of a connection between a synchronization device and a primary device (block 105). As noted above, the synchronization device may be a car kit that is capable of being linked with a user's mobile device. As is known, such a device may allow the mobile device's functionality to be utilized via a car kit interface. For example, incoming and outgoing telephone calls may be answered and initiated, respectively, using the car kit interface with call audio presented over the vehicle's audio system. Likewise, the car kit interface may be utilized to play audio files stored on the mobile device or streamed by the mobile device from a remote source over the vehicle's audio system. Although the synchronization device has been described as a car kit, other synchronization devices may be used to link a mobile phone or other device to a home telephone system, a television, a home audio system, etc.

As is known by those skilled in the art, various methods exist for establishing a connection between a synchronization device and a mobile device. In one embodiment, the connection between the primary device and the synchronization device may be a wireless personal area network (WPAN) connection. For example, the connection may be based on known radio or optical communication technologies (such as Bluetooth or infrared based communication technologies) and may be initiated from either the synchronization device or the primary device. (BLUETOOTH is a registered trademark of Bluetooth SIG, Inc.)

After the connection is established between the primary device and the synchronization device, a first list of contact information that is stored on the primary device may be provided to the synchronization device over the established connection (block 110). The transfer of contact information may be based on any protocol that allows the information to be retrieved by the synchronization device over the established connection. In one embodiment, the provision of contact information may be based on the Bluetooth Phone Book Access Profile (PBAP) specification. As is known by those skilled in the art, the PBAP specification is based on a model by which a client device (e.g., the synchronization device) retrieves information from a server device (e.g., the primary device) according to functions defined by the specification. Although contact information has been described as being retrieved by the synchronization device (i.e., pulled), contact information may also be transmitted by the primary device (i.e., pushed).

The obtained contact information may include a contact list (e.g., a list of contact information associated with individuals with whom the primary device's user frequently interacts), call history information (e.g., a listing of telephone numbers and other information associated with recent incoming, outgoing, or missed calls on the primary device), and/or any other contact information stored on the primary device. If it is determined that desired contact information is included in the contact information transferred from the primary device to the synchronization device (the "Yes" prong of block 115), the contact information may be utilized to initiate communication via the primary device from a synchronization device interface (block 120). For example, a user may utilize the contact information to cause the primary device to redial a telephone number associated with a recently missed call or to dial a telephone number associated with a contact stored on the primary device through a synchronization device interface.

If, however, the desired information is not included in the contact information communicated from the primary device to the synchronization device (the "No" prong of block 115), a connection between the synchronization device and a secondary device may be established (block 125). The connection between the secondary device and the synchronization device may be established in a similar manner as described above with respect to the connection of the primary device and the synchronization device. In one embodiment, the primary, secondary, and synchronization devices may be located in close proximity to each other and may be interconnected via a common personal area network. For example, if the synchronization device is a Bluetooth car kit, the devices may all be located within a vehicle. In one embodiment, the connection between the secondary device and the synchronization device may be initiated based on a knowledge that the desired contact information exists on the secondary device. For example, if it is desired to initiate a telephone call using the synchronization device interface to an individual whose contact information is known to be present on the secondary device (e.g., known by a user of the synchronization device) but not on the primary device, the connection between the secondary device and the synchronization device may be initiated. As with the connection between the primary and synchronization devices, the connection between the secondary and synchronization devices may be initiated from either the secondary device or the synchronization device.

After the connection between the secondary and synchronization devices is established, a second list of contact information that is stored on the secondary device may be provided to the synchronization device (e.g., sent by the secondary device or retrieved from the secondary device) via the established connection (block 130). The synchronization device may therefore obtain a first list of contact information from the primary device and a second list of contact information from the secondary device. In one embodiment, the type of contact information to be delivered by the secondary device may be specified in a request for the information. For example, only the desired contact information may be transferred from the secondary device to the synchronization device. In such an embodiment, the desired information may be communicated from the synchronization device to the secondary device. For example, a name of an individual for whom contact information is desired may be entered via a synchronization device interface (e.g., a voice recognition interface) and the secondary device may therefore return contact information associated with that individual's name. In another embodiment, all of the contact information available on the secondary device may be requested. It should be noted that the primary device may maintain its connection with the synchronization device while the connection is established with the secondary device and the contact information is received from the secondary device.

In one embodiment, after the contact information is received from the secondary device, the connection between the secondary device and the synchronization device may be terminated. In such an embodiment, the contact information retrieved from the secondary device may only be available during the existing session between the primary device and the synchronization device. That is, the second list of contact information may only be temporarily saved on the synchronization device for use during the time that the existing connection between the primary device and the synchronization device is in effect. Such use restrictions may be defined by the secondary device when the contact information is provided to the synchronization device. In another embodiment, however, the secondary device may authorize the synchronization device to relay the information to the primary device. In such embodiments, the synchronization device may not only provide access to the desired contact information but may also relay the desired information to the primary device.

After the contact information is received from the secondary device by the synchronization device, communication may be initiated via the primary device from a synchronization device interface using contact information received from the secondary device (block 135). For example, from an interface of the synchronization device, a telephone number provided by the secondary device may be selected to initiate a telephone call via the primary device.

Figure 2:
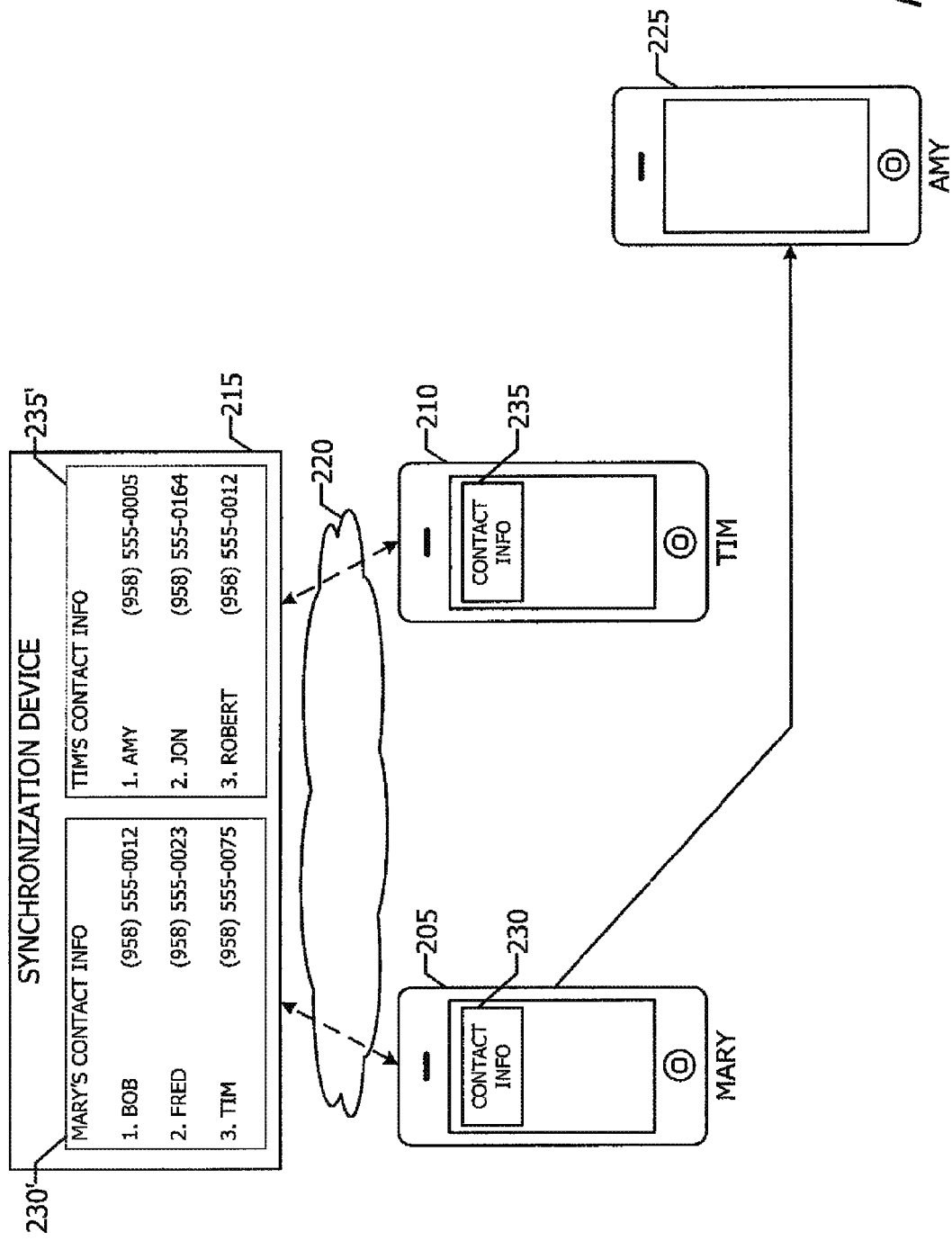
FIG. 2 is a block diagram illustrating the process of FIG. 1 in accordance with one embodiment.

Referring to FIG. 2, example contact retrieval process 100 is illustrated in block diagram form. Primary device 205 (e.g., Mary's device) is connected to synchronization device 215 via network 220. As described above, network 220 may represent a wireless personal area network (WPAN). However, network 220 may take any form and may use any desired technology (wired, wireless or a combination thereof) and protocol (e.g., Bluetooth Low Energy (BLE), near field communication (NFC), Wi-Fi Direct, etc.). As described above with respect to process 100, some or all of contact information 230 may be passed via network 220 from primary device 205 to synchronization device 215. Contact information 230 may be contained in a data store on, or accessible to, primary device 205. In one embodiment, the amount and type of contact information 230 that is to be retrieved from a connected primary device may be predefined such that the information may be obtained automatically when the devices are connected. For example, according to a default setting, synchronization device 215 may obtain all name and phone number information stored locally on device 205 and all call history information within a certain time period (e.g., incoming, outgoing, and missed calls within the past 10 days) when the devices are connected. In another embodiment, contact information may only be retrieved by synchronization device 215 in response to a request to obtain such information by a user of synchronization device 215. According to such an embodiment, rather than automatically obtaining the predefined contact information, synchronization device 215 may wait for a request from the user to obtain the specific information. Because the contact information received at synchronization device 215 may include all or just a portion of contact information 230, it is labeled as 230'.

Once present on synchronization device 215, contact information 230' may be utilized from a synchronization device interface in a similar manner as the information may be used directly on device 205. By way of example, a telephone call may be initiated to the telephone number associated with "Fred" from an interface of synchronization device 215. For example, synchronization device 215 may be a car kit that has a touch screen or voice recognition interface that allows a driver (or passenger) to initiate a request (e.g., by touching a portion of the screen or speaking a name or number) to cause primary device 205 to initiate the telephone call to the telephone number associated with Fred in contact information 230'. The telephone call may then be conducted using the car kit interface (e.g., using a microphone and audio system associated with the car kit).

If, however, the desired information is not included in contact information 230', it may be more cumbersome to initiate communication. While synchronization device 215 may include an interface to manually initiate a desired communication (e.g., manually enter a telephone number), it may be inconvenient to enter the information or the necessary information may not be known by a user of synchronization device 215. If the desired contact information is stored on secondary device 210, it may be desirable to temporarily connect secondary device 210 to synchronization device 215 such that the desired contact information may be obtained by synchronization device 215.

As illustrated, secondary device 210 may be connected to synchronization device 215 via network 220 in a similar manner to primary device 205. Although primary device 205 and secondary device 210 are illustrated as being connected to synchronization device 215 via common network 220, in another embodiment synchronization device 215 may maintain separate connections through separate networks with each of primary device 205 and secondary device 210. In such an embodiment, primary device 205 and secondary device 210 may each be unaware of the other device's connection to synchronization device 215.

After a connection is established between secondary device 210 and synchronization device 215, some or all of contact information 235 may be transferred to synchronization device 215. Contact information 235 may be contained in a data store on, or accessible to, secondary device 210. In one embodiment, synchronization device 215 may request all of the contents of contact information 235 stored on secondary device 210. In another embodiment, synchronization device 215 may request a portion of contact information 235 stored on secondary device 210. For example, it may be known that the desired contact information involves a telephone number associated with a recently dialed call on secondary device 210. Thus, a user of synchronization device 215 may initiate a command that causes synchronization device 215 to request telephone numbers associated with calls dialed on secondary device 210 during a certain period (e.g., the 10 most recent dialed calls or all calls dialed in the last 24 hours). In yet another embodiment, synchronization device 215 may request a specific piece of contact information 235 stored on secondary device 210. For example, the desired contact information may be a telephone number associated with a specific individual within contact information 235. Accordingly, a user of synchronization device 215 may initiate a command that identifies the individual and causes synchronization device 215 to obtain the telephone number(s) associated with the individual in contact information 235. Because the contact information received at synchronization device 215 may include all or just a portion of contact information 235, it is labeled as 235'.

As described briefly above, contact information 230' and 235' may be obtained by synchronization device 215 according to the Bluetooth PBAP specification. As is known by those skilled in the art, the PBAP specification may allow a client device to request contact information, specify desired attributes (e.g., name, telephone number, electronic mail address, etc.), specify a sort order for returned information, and provide a search term for which matching results should be returned from a server device. Although the PBAP specification has been described, it will be recognized that contact information might also be obtained according to other known specifications and/or protocols.

In the illustrated embodiment, secondary device 210 belongs to a different user (i.e., Tim) than the user of primary device 205 (i.e., Mary). By way of example, secondary device 210 may belong to a friend that is travelling in a vehicle with the user of device 205. In another embodiment, primary device 205 and secondary device 210 may each belong to the same user. For example, primary device 205 may be a personal mobile phone that primarily includes personal contact information while secondary device 210 may be a work laptop or PDA that primarily includes business contact information. In such a scenario, if the user of each of the devices links primary device 205 with synchronization device 215 but later desires to initiate a call to a work associate, secondary device 210 may be temporarily linked with synchronization device 215 to retrieve contact information for the work associate.

In the illustrated embodiment, contact information 230' and 235' may be maintained and presented to a user separately. Such an arrangement may be beneficial in that a user may quickly identify the source of contact information on synchronization device 215. In an alternate embodiment, synchronization device 215 may merge contact information 230' and 235'. This type of arrangement may be beneficial in that it may provide a unified listing of contact information. It should be noted that merging contact information 230' and 235' may involve identifying redundancy between contact information obtained from the multiple sources. For example, in the illustrated embodiment contact information 230' includes a listing for "Bob" that is associated with the same telephone number as a listing for "Robert" in contact information 235'. Thus, merging contact information 230' and 235' may involve resolving redundancies between contact information 230' and 235'. In the case of redundant entries that include inconsistent data (e.g., entries for the same name having inconsistent telephone numbers), the separate listings may be maintained or the inconsistency may be resolved according to settings of the synchronization device (e.g., favoring one of the primary or secondary devices over the other, etc.).

After contact information 235' is received at synchronization device 215, it may be utilized in the same manner as contact information 230'. Thus, in the illustrated embodiment, a user of synchronization device 215 may obtain contact information for "Amy" and "Jon" that is not present in contact information 230'. As illustrated, contact information 235' may be utilized to initiate a telephone call or other communication with device 225 (e.g., Amy's device) via primary device 205 through an interface of synchronization device 215. Accordingly, the functionality of synchronization device 215 may be improved by enabling the retrieval of additional contact information via a temporary connection to a secondary device. Although contact retrieval process 100 has been described in terms of the retrieval of information from a second connected device, it will be understood that contact information may be obtained from additional devices as ell. Furthermore, although the obtained contact information has been described in terms of its use in placing a telephone call, the contact information may be utilized to initiate other communications (e.g., short message service (SMS) text messages, emails, etc.) via the synchronization device interface.

Figure 3:
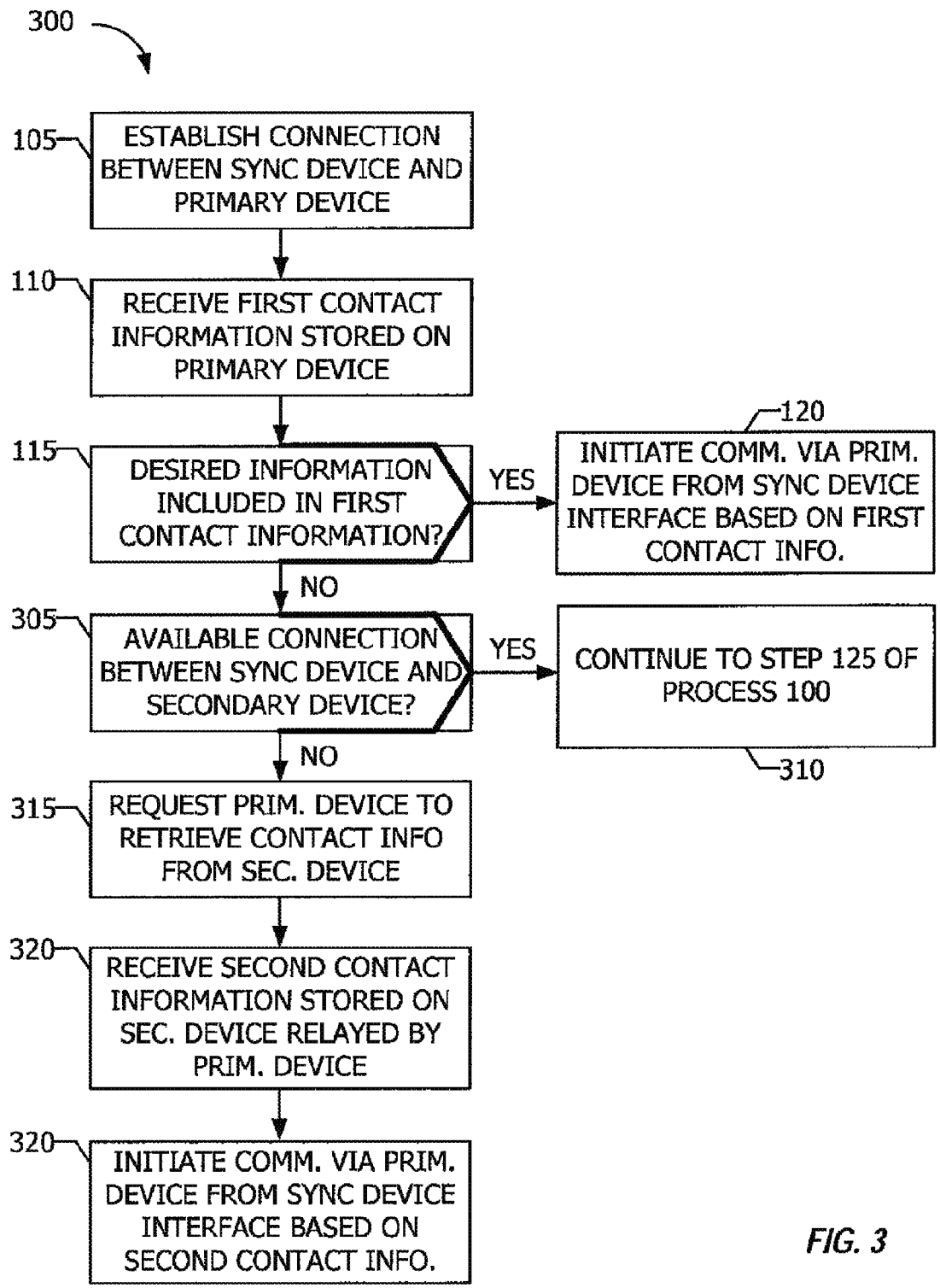
FIG. 3 is a flowchart that illustrates the retrieval of contact information by a synchronization device from a remote secondary device in accordance with one embodiment.

Referring to FIG. 3, contact retrieval process 300 in accordance with another embodiment differs from process 100 in that if it is determined that the desired contact information cannot be retrieved via a direct connection to a secondary device (the "No" prong of block 305), the primary device may serve as a relay to deliver information obtained from a remote secondary device to the synchronization device. In one embodiment, determining whether contact information may be obtained via a direct connection to a secondary device may include searching for devices that are within communications range of the synchronization device. For example, if a user indicates that desired contact information is not available in the contact information retrieved from the primary device (the "No" prong of block 115), the synchronization device may attempt to identify compatible devices that are within range (e.g., perform a Bluetooth discovery operation). If one or more devices are identified as within range (the "Yes" prong of block 305), a device with which to initiate a connection may be selected (e.g., by a user of the synchronization device) and contact information may be obtained directly from the connected secondary device as described above with respect to process 100 (block 310). If, however, no devices from which the desired information may be obtained are available for direct connection to the synchronization device (the "No" prong of block 305), the synchronization device may request the primary device to retrieve contact information from a remote secondary device via an available connection between the primary device and the remote secondary device (block 315).

In one embodiment, the remote secondary device may be identified in the first contact information received from the primary device. Therefore, the synchronization device may provide an interface that enables a user to identify contact information for a remote secondary device that may be able to provide the desired contact information. Accordingly, a user of the synchronization device may initiate a command by which the synchronization device may cause the primary device to send a request for contact information to a remote secondary device. In one embodiment, the user may identify both the remote secondary device and the desired contact information through a synchronization device interface. In another embodiment, the user may simply identify the remote secondary device and may request that all available contact information be provided. The request may then be sent from the primary device via any acceptable communication protocol. For example, the request may be sent as a short message service (SMS) message, an email message, an instant message application message, or any other acceptable protocol.

In one embodiment, the request may not require any participation on the part of a user of the remote secondary device. In such an embodiment, a user of the remote secondary device may identify contact information that they are willing to share and possibly the devices with which they are willing to share the information. If a request from a device identified as an appropriate device with which to share contact information seeks contact information identified as information that the user is willing to share, a response to the request may be generated by the remote secondary device without any user interaction. In another embodiment, the remote secondary device may determine an appropriate response to the request (e.g., information corresponding to an individual identified in the request) and may prompt the user to authorize the response prior to sending the information to the primary device. Like the request received by the remote secondary device, the response may be sent via any communication protocol and may use either the same or different protocol as the request. The response received from the remote secondary device may include use restrictions. For example, the use restrictions may limit the usage of the provided information to the duration of the connection between the primary device and the synchronization device.

Upon receiving the requested contact information, the primary device may relay the contact information to the synchronization device (block 320). Thereafter, communication may be initiated via the primary device from a synchronization device interface using contact information received from the remote secondary device (block 320) in the same manner as described above with respect to process 100.

Figure 4:
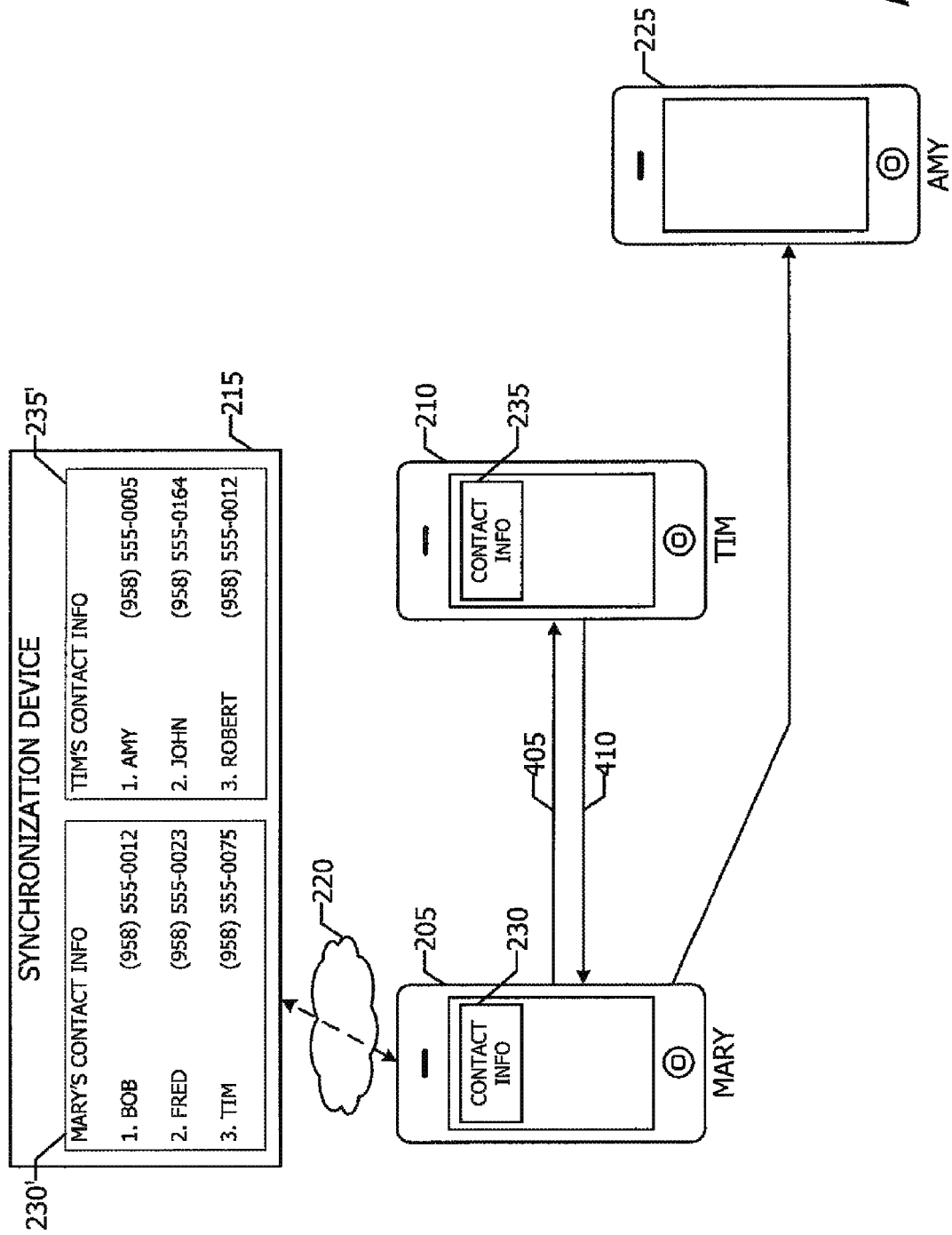
FIG. 4 is a block diagram illustrating the process of FIG. 3 in accordance with one embodiment.

Referring to FIG. 4, example contact retrieval process 300 is illustrated in block diagram form. Primary device 205 is connected to synchronization device 215 via network 220 and contact information 230' is obtained from primary device 205 in the same manner as described above with respect to process 100. In contrast to process 100, however, when it is determined that the desired contact information is not included in contact information 230' and that no direct connection to a secondary device is available (e.g., secondary device 210 is not within communications range of synchronization device 215), a request to obtain information from a remote secondary device may be initiated from an interface of synchronization device 215. In one embodiment, a user of synchronization device 215 may select to retrieve information from remote secondary device 210 based on contact information 230'. For example, in the illustrated embodiment, contact information 230' includes a telephone number for remote secondary device 210 (i.e., Tim's device). The user may therefore initiate a request (through a synchronization device interface) to retrieve desired contact information from a selected secondary device. The synchronization device interface may enable a user to provide information necessary to construct the request for information from the remote secondary device. The request may include contact information for the secondary device or user of the secondary device (e.g., a telephone number, name, email address, social network identity, etc.) as well as an identifier of the desired information. The identifier may include a request for all available contact information stored on remote secondary device 210, a portion of the available contact information stored on remote secondary device 210 (e.g., recent call history information), or specific contact information stored on remote secondary device 210 (e.g., contact information associated with a specific individual).

When a request is initiated to obtain contact information from a remote secondary device through a synchronization device interface, the request may be routed through primary device 205 and directed to the selected remote secondary device 210 via a network connection between primary device 205 and remote secondary device 210 (405). Remote secondary device 205 may process the information contained in request 405 in order to determine whether the requested information is included within local contact information 235. In one embodiment, if remote secondary device 210 has been configured to automatically respond to requests for information (and request 405 meets any predefined conditions for providing the information), response 410 may be transmitted to primary device 205 without any action on the part of a user of remote secondary device 210. In another embodiment, request 405 may cause remote secondary device 210 to prompt a user to authorize response 410 prior to sending the response to primary device 205.

In one embodiment, device 210 may be capable of discerning the desired information even where the information identified in request 405 does not exactly match a record stored in contact information 235. For example, in the illustrated embodiment, if request 405 seeks contact information for "Jonathan," remote secondary device 210 may be capable of determining that response 410 should include the contact information associated with "John" in contact information 235. Upon receipt of response 410, primary device 210 may relay the included information to synchronization device 215 via the established connection over network 220. Contact information 235' may then be utilized in the same manner as if it was obtained through a direct connection to secondary device 210. Therefore, contact information 235' may be utilized to initiate communication with device 225 via primary device 205 from an interface of synchronization device 215. In addition to obtaining contact information directly from a secondary device, a synchronization device in accordance with this disclosure may also relay a request for contact information through a connected primary device to a remote secondary device.

Figure 5:
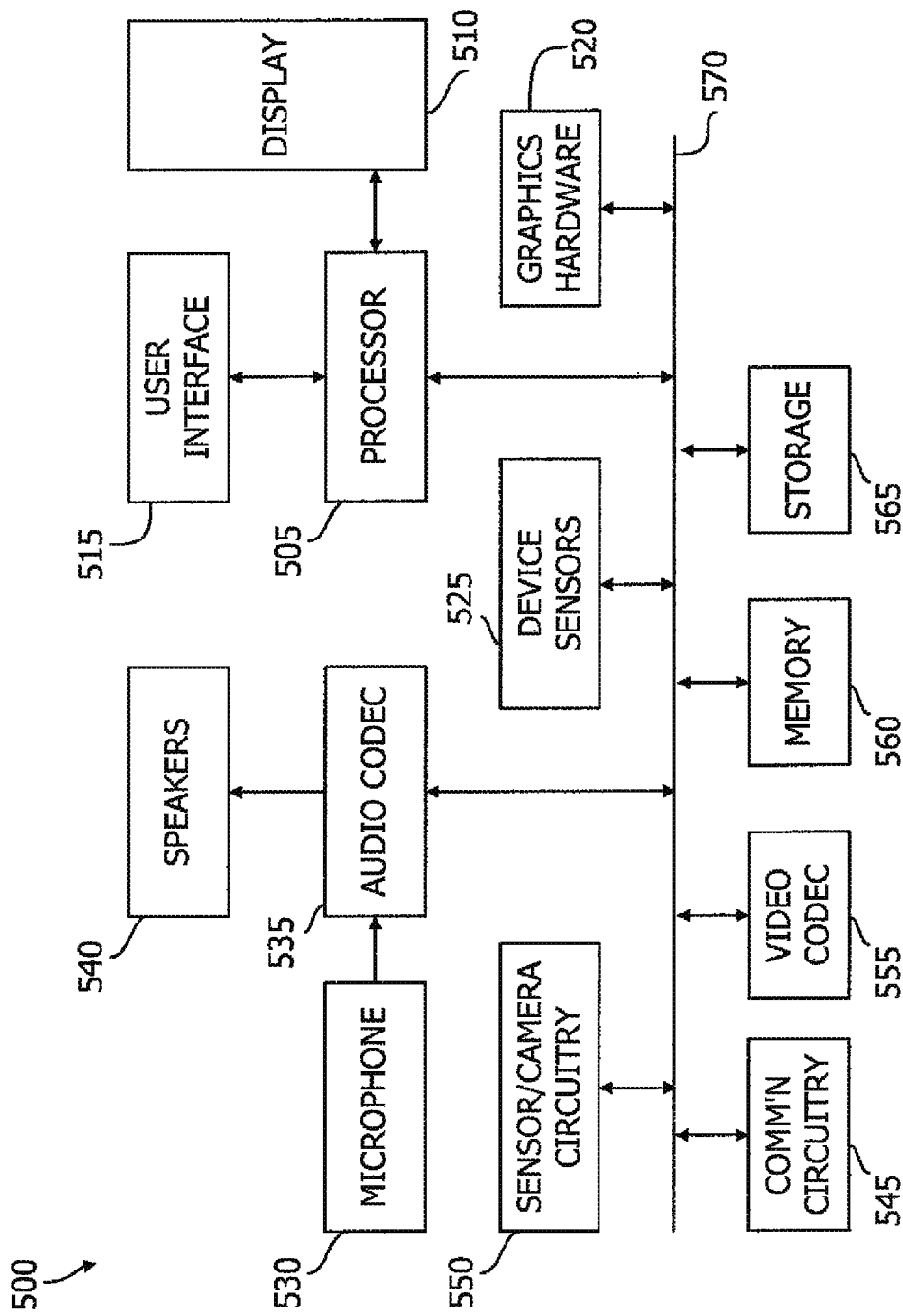
FIG. 5 is a block diagram of an illustrative electronic device in accordance with one embodiment.

Referring to FIG. 5, a simplified functional block diagram of illustrative electronic device 500 is shown according to one embodiment. Electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. Electronic device 500 may be, for example, a personal digital assistant (PDA), personal music player, mobile telephone, notebook, laptop or a tablet computer, desktop computer, or server computer. More particularly, any of the devices described above (e.g., devices 205, 210, 215, and 225) may take the form of device 500.

Processor 505 may execute instructions necessary to carry out or control the operation of many functions performed by device 500. Processor 505 may, for instance, drive display 510 and receive user input from user interface 515. User interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A device, comprising:
    a memory; and
    a processor operatively coupled to the memory and adapted to execute program code stored in the memory to—
    establish a connection with a synchronization device,
    provide first contact information from a data store on the device to the synchronization device over the connection,
    receive a request from the synchronization device to obtain contact information for a recipient device from a remote secondary device, the request identifying the remote secondary device and containing information to allow the remote secondary device to identify the contact information for the recipient device,
    send the request to the remote secondary device,
    receive a response comprising the contact information for the recipient device,
    relay the contact information for the recipient device to the synchronization device over the connection,
    receive a request from the synchronization device to initiate communication with the recipient device, and
    initiate the communication with the recipient device, the communication to be conducted using the synchronization device.

2. The device of claim 1, wherein the contact information for the recipient device comprise call history information.

3. The device of claim 1, wherein the contact information for the recipient device comprises use restrictions.

4. The device of claim 3, wherein the use restrictions limit use of the contact information for the recipient device by the synchronization device to a duration of the first connection.

5. The device of claim 1, wherein the memory further comprises program code to request, by the synchronization device, the contact information for the recipient device from the secondary device.

6. The device of claim 5, wherein the program code to request the contact information for the recipient device comprises program code to receive, by the synchronization device, a command identifying a name of a user of the recipient device.

7. The device of claim 1, further comprising program code to terminate, by the synchronization device, the second connection after the contact information for the recipient device is received.

8. A non-transitory program storage device, readable by a processor and comprising instructions stored thereon to cause the processor to:
    establish a connection with a synchronization device,
    provide first contact information from a data source on the device to the synchronization device over the connection,
    receive a request from the synchronization device to obtain contact information for a recipient device from a remote secondary device, the request identifying the remote secondary device and containing information to allow the remote secondary device to identify the contact information for the recipient device,
    send the request to the remote secondary device,
    receive a response comprising the contact information for the recipient device,
    relay the contact information for the recipient device to the synchronization device over the connection,
    receive a request from the synchronization device to initiate communication with the recipient device, and
    initiate the communication with the recipient device, the communication to be conducted using the synchronization device.

9. The non-transitory program storage device of claim 8, wherein the contact information for the recipient device comprises call history information.

10. The non-transitory program storage device of claim 8, wherein the contact information for the recipient device comprises use restrictions.

11. The non-transitory program storage device of claim 10, wherein the use restrictions limit use of the contact information for the recipient device by the synchronization device to a duration of the first connection.

12. The non-transitory program storage device of claim 8, further comprising instructions to cause the processor to request, by the synchronization device, the contact information for the recipient device from the secondary device.

13. The non-transitory program storage device of claim 12, wherein the instructions to cause the processor to request the contact information for the recipient device comprise instructions to cause the processor to receive, by the synchronization device, a command identifying a name of a user of the recipient device.

14. The non-transitory program storage device of claim 8, further comprising instructions to cause the processor to terminate, by the synchronization device, the second connection after the contact information for the recipient device is received.

15. A method comprising:
    establishing a connection with a synchronization device,
    providing first contact information from a data store on the device to the synchronization device over the connection,
    receiving a request from the synchronization device to obtain contact information for a recipient device from a remote secondary device, the request identifying the remote secondary device and containing information to allow the remote secondary device to identify the contact information for the recipient device,
    sending the request to the remote secondary device,
    receiving a response comprising the contact information for the recipient device,
    relaying the contact information for the recipient device to the synchronization device over the connection,
    receiving a request from the synchronization device to initiate communication with the recipient device, and
    initiating the communication with the recipient device, the communication to be conducted using the synchronization device.

16. The method of claim 15, wherein the contact information for the recipient device comprises call history information.

17. The method of claim 15, wherein the contact information for the recipient device comprises use restrictions.

18. The method of claim 17, wherein the use restrictions limit use of the contact information for the recipient device by the synchronization device to a duration of the first connection.

19. The method of claim 18, wherein the act of requesting the contact information for the recipient device comprises receiving, by the synchronization device, a command identifying a name of a user of the recipient device.

20. The method of claim 15, further comprising requesting, by the synchronization device the contact information for the recipient device from the secondary device.

\* \* \* \* \*